US011698853B2

(12) United States Patent
Windh et al.

(10) Patent No.: US 11,698,853 B2
(45) Date of Patent: Jul. 11, 2023

(54) SATURATING LOCAL CACHE IN MEMORY-COMPUTE SYSTEMS

(71) Applicant: Micron Technology, Inc., Boise, ID (US)

(72) Inventors: Skyler Arron Windh, McKinney, TX (US); Randall Meyer, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 64 days.

(21) Appl. No.: 17/361,691

(22) Filed: Jun. 29, 2021

(65) Prior Publication Data

US 2022/0206937 A1 Jun. 30, 2022

Related U.S. Application Data

(60) Provisional application No. 63/132,799, filed on Dec. 31, 2020.

(51) Int. Cl.
G06F 12/02 (2006.01)
G06F 12/0893 (2016.01)
G06F 12/084 (2016.01)
G06F 12/0868 (2016.01)

(52) U.S. Cl.
CPC ........ *G06F 12/0246* (2013.01); *G06F 12/084* (2013.01); *G06F 12/0868* (2013.01); *G06F 12/0893* (2013.01)

(58) Field of Classification Search
CPC ............. G06F 12/0246; G06F 12/0868; G06F 12/084; G06F 12/0893
USPC ....................................................... 711/154
See application file for complete search history.

(56) References Cited

U.S. PATENT DOCUMENTS

| 8,122,229 | B2 | 2/2012 | Wallach et al. |
|---|---|---|---|
| 8,156,307 | B2 | 4/2012 | Wallach et al. |
| 8,205,066 | B2 | 6/2012 | Brewer et al. |
| 8,423,745 | B1 | 4/2013 | Brewer |
| 8,561,037 | B2 | 10/2013 | Brewer et al. |
| 9,710,384 | B2 | 7/2017 | Wallach et al. |
| 10,990,391 | B2 | 4/2021 | Brewer |

(Continued)

FOREIGN PATENT DOCUMENTS

| WO | 2010051167 | 5/2010 |
|---|---|---|
| WO | 2013184380 | 12/2013 |

(Continued)

OTHER PUBLICATIONS

Beamer, Scott, "Direction-Optimizing Breadth-First Search", SC '12: Proceedings of the International Conference on High Performance Computing, Networking, Storage and Analysis, (Nov. 2012), 10 pgs.

(Continued)

*Primary Examiner* — Hua J Song
(74) *Attorney, Agent, or Firm* — Schwegman Lundberg & Woessner, P.A.

(57) ABSTRACT

Latency in a node-based compute-near-memory system can be problematic. A solution to the problem can include or use a dedicated software-based cache at each node. The cache can be configured to store information received from each of the other nodes in the system. In an example, the cache can be populated during a breadth first search algorithm to store frontier information from each of the other nodes.

20 Claims, 15 Drawing Sheets

(56) References Cited

U.S. PATENT DOCUMENTS

| | | |
|---|---|---|
| 10,990,392 B2 | 4/2021 | Brewer |
| 2008/0270708 A1 | 10/2008 | Warner et al. |
| 2012/0079177 A1 | 3/2012 | Brewer et al. |
| 2013/0332711 A1 | 12/2013 | Leidel et al. |
| 2015/0143350 A1 | 5/2015 | Brewer |
| 2015/0206561 A1 | 7/2015 | Brewer et al. |
| 2019/0042214 A1 | 2/2019 | Brewer |
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2020/0349076 A1* | 11/2020 | Dropps ............... G06F 12/0817 |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |
| 2021/0240621 A1* | 8/2021 | Fu ........................ G06F 12/084 |

FOREIGN PATENT DOCUMENTS

| | | |
|---|---|---|
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

OTHER PUBLICATIONS

Soundararajan, Vijayaraghavan, "Flexible Use of Memory for Replication Migration in Cache-Coherent DSM Multiprocessors", Technical Report: CSL-TR-99-789, (Nov. 1999), 143 pgs.

* cited by examiner

SATURATING LOCAL CACHE IN MEMORY-COMPUTE SYSTEMS

CROSS-REFERENCE TO RELATED APPLICATIONS

This application claims the benefit of priority of U.S. Patent Application Ser. No. 63/132,799, filed Dec. 31, 2020, which is herein incorporated by reference in its entirety.

STATEMENT REGARDING FEDERALLY SPONSORED RESEARCH OR DEVELOPMENT

This invention was made with Government support under Agreement No. HR0011-19-3-0002, awarded by DARPA. The Government has certain rights in the invention.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
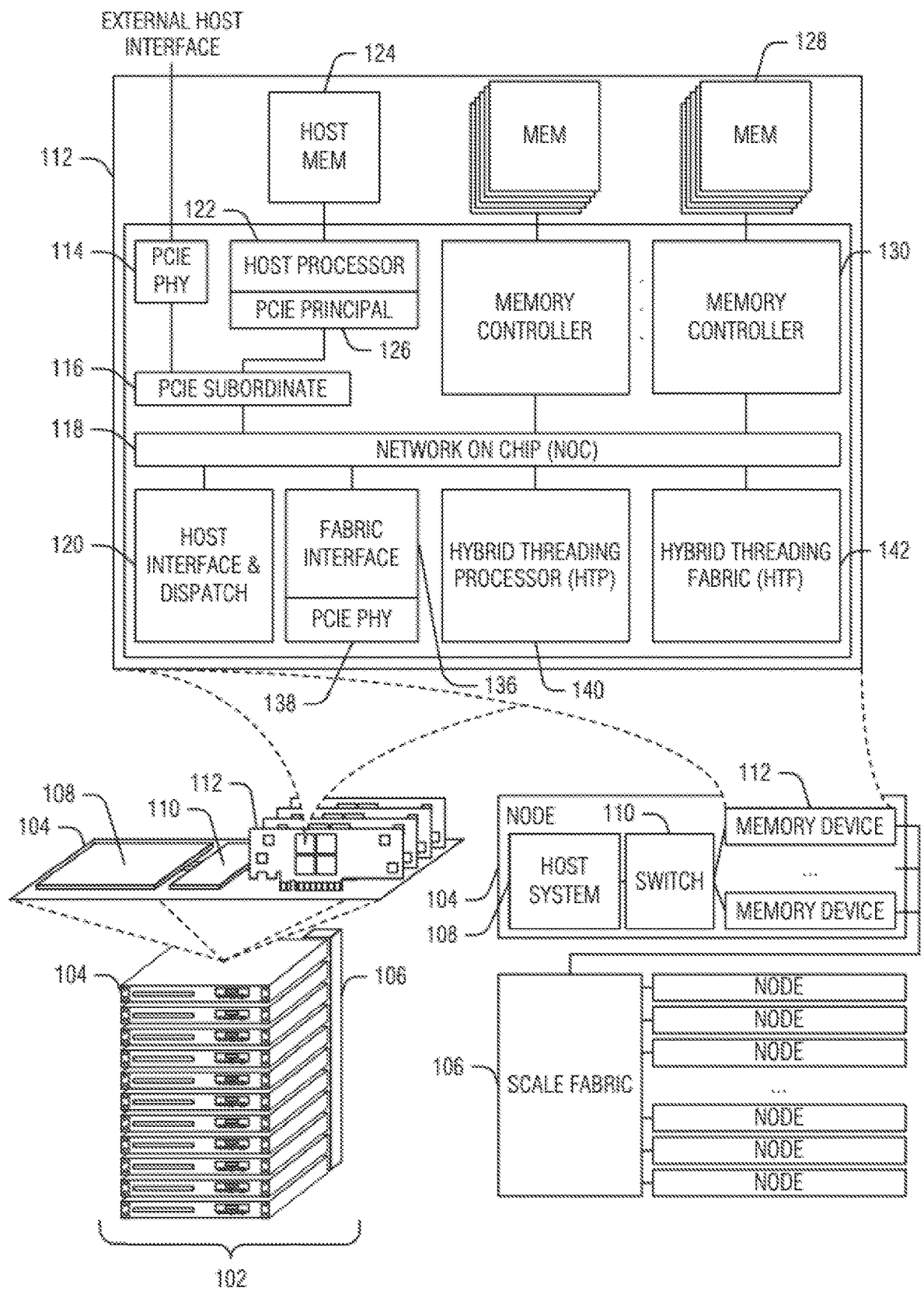
FIG. 1 illustrates generally a first example of a first memory-compute device in the context of a memory-compute system, according to an embodiment.

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

As discussed in greater detail below, particularly with regard to FIG. 9 through FIG. 13, latency in a node-based CNM system can be problematic. The problem can include efficiently using a breadth first search (BFS) algorithm over a large number of nodes in the system, such as where each node can include local memory stores that are accessible by the same node or by another node in the system. The present inventors have recognized that a solution to the problem can include or use a dedicated, saturating software-based cache at each node. For example, in BFS algorithms, the frontier for vertices with a relatively higher degree, or with the most "counts." can be more likely to be accessed during a search. To improve performance, a bottom up (BU) phase of a BFS algorithm can use a local cache (e.g., a software-implemented cache of, for example, 1024×64-bit words per memory-compute device in the system) to store the results of remote accesses to the frontier information corresponding to the highest degree vertices. For example, at a first node, a first access of one of the high-degree vertices can read an element from a remote location (i.e., a location that is remote from the first node), and then store the element in the local cache at the first node. In this manner, subsequent attempts to access the same remote location, from the first node, can be fulfilled by the local software cache at the first node, and thereby help avoid latency-causing remote access activity.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a compute-near-memory system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a compute-near-memory system can be particularly suited for implementing a hierarchy of instructions and nested loops (e.g., two, three, or more, loops deep, or multiple-dimensional loops). A standard compiler can be used to accept high-level language instructions and, in turn, compile directly into the dataflow architecture of one or more of the nodes. For example, a node in the system can include a hybrid threading fabric accelerator. The hybrid threading fabric accelerator can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

Figure 6A:
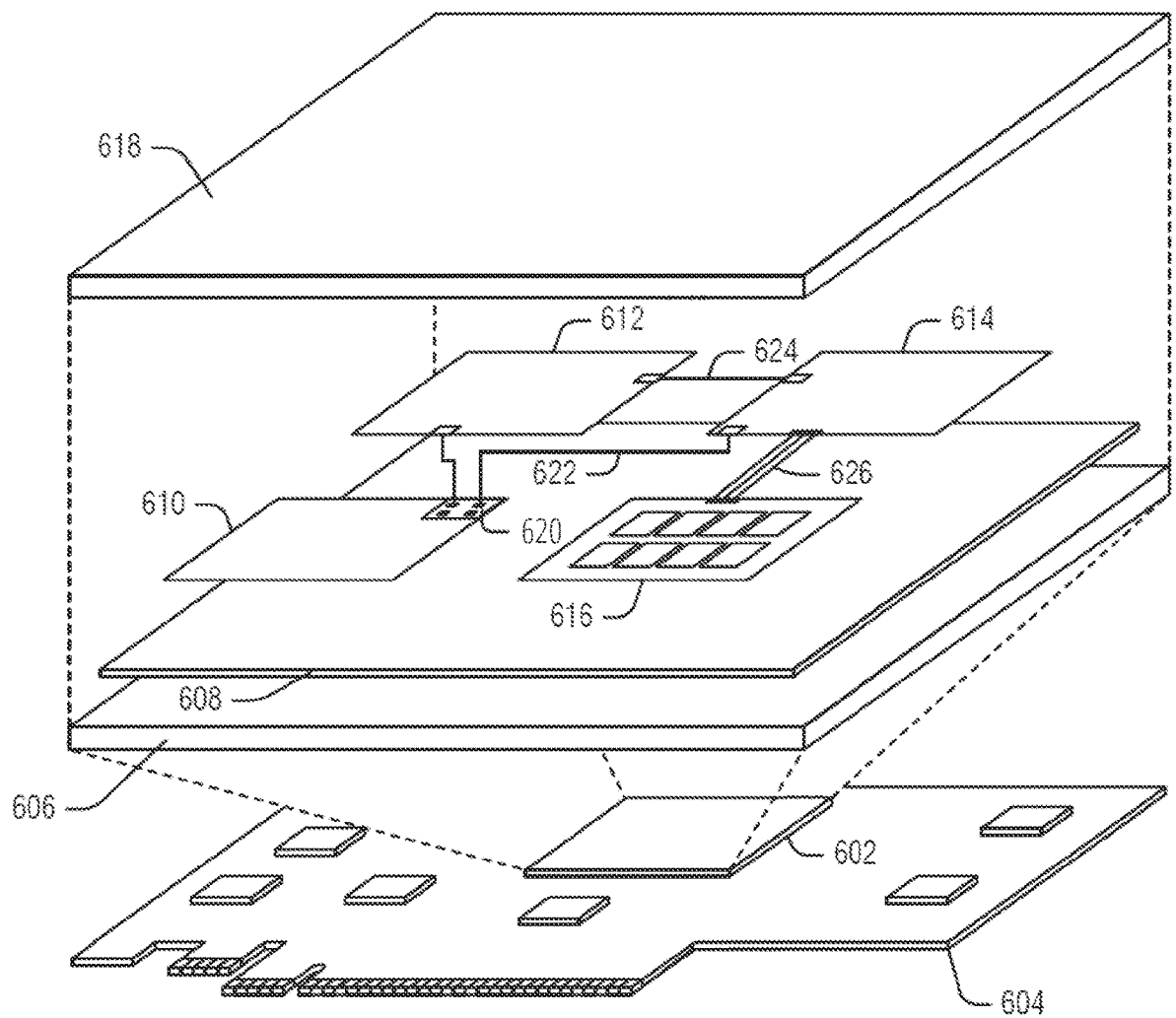
FIG. 6A illustrates generally an example of a chiplet system, according to an embodiment.
Figure 6B:
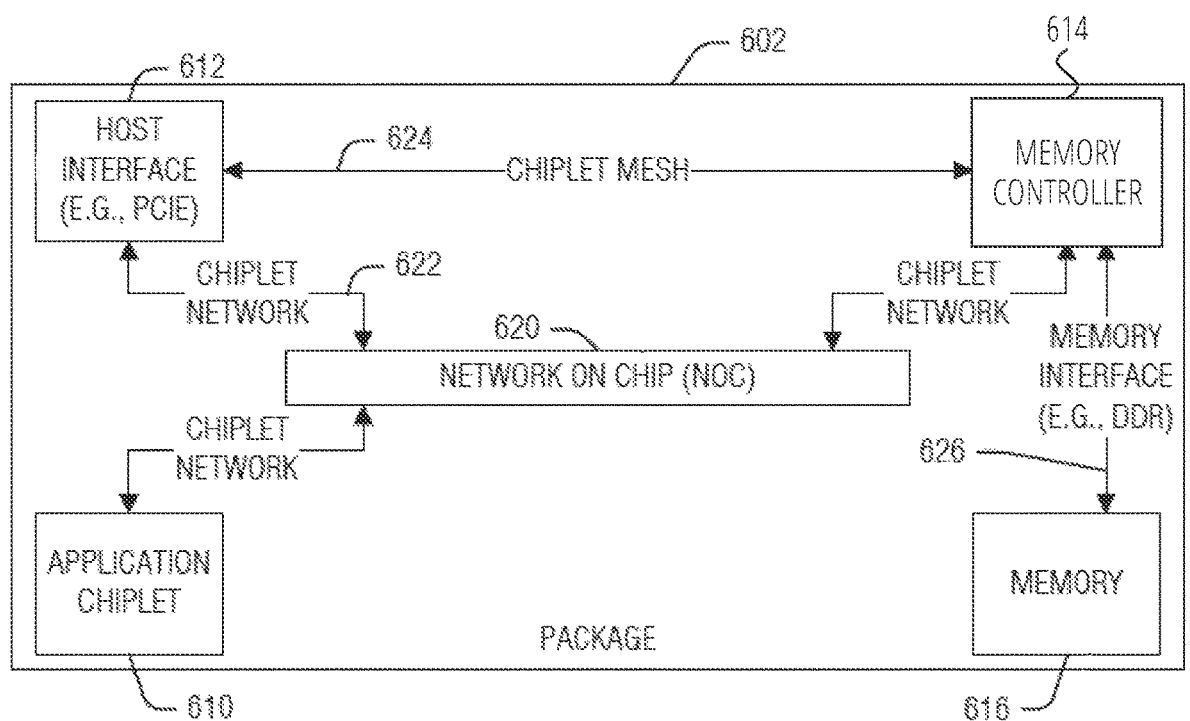
FIG. 6B illustrates generally a block diagram showing various components in the chiplet system from the example of FIG. 6A.

A compute-near-memory system, or nodes or components of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits than single die chips, including higher yields or reduced development costs. FIG. 6A and FIG. 6B, discussed below, illustrate generally an example of a chiplet system such as can comprise a compute-near-memory system.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced eXtensible Interface (AXI) is a specification for intra-chip communications, AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
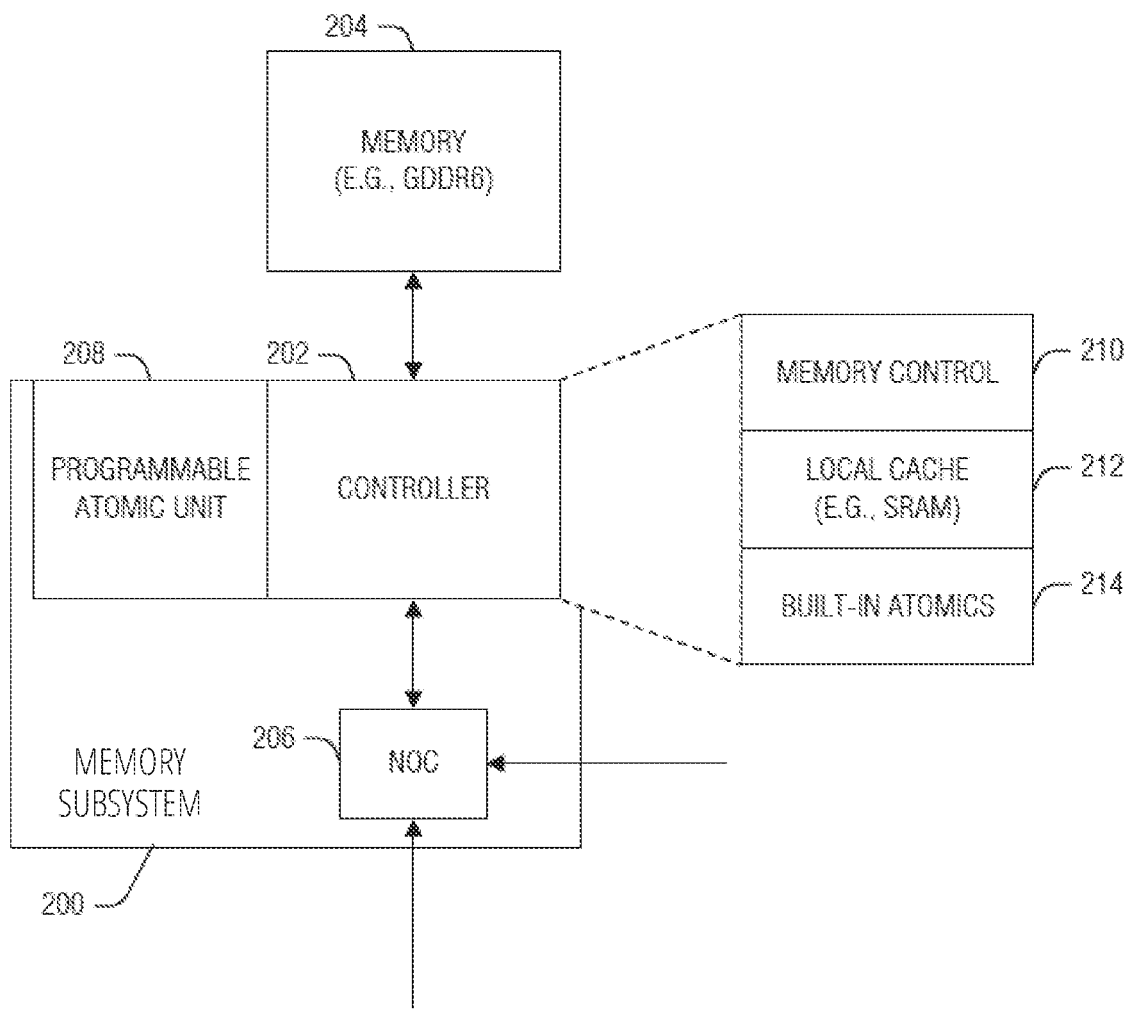
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
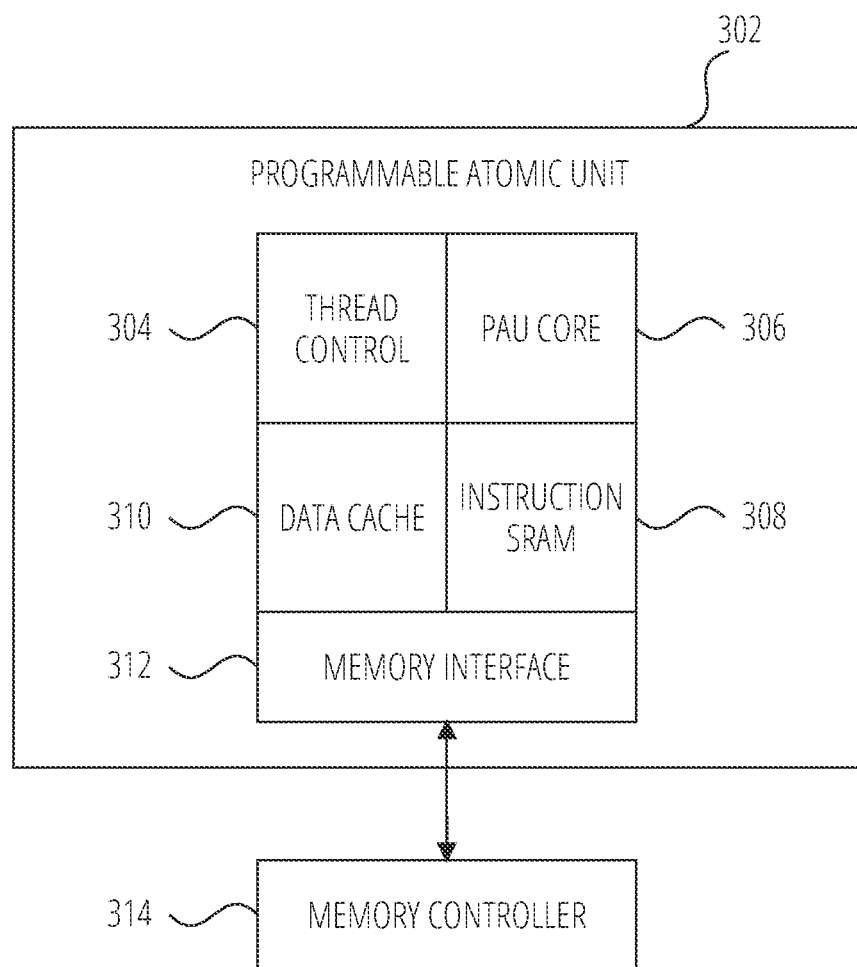
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) in memory local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the data cache 310 or instruction SRAM 308 inside the PAU. If the cache line is dirty, then the built-in atomic operator will not be operating on the most current data until the data cache 310 is flushed to synchronize the cache and the other or off-die memories. This same situation could occur with other hardware blocks of the memory controller, such as cryptography block, encoder, etc.

Figure 4:
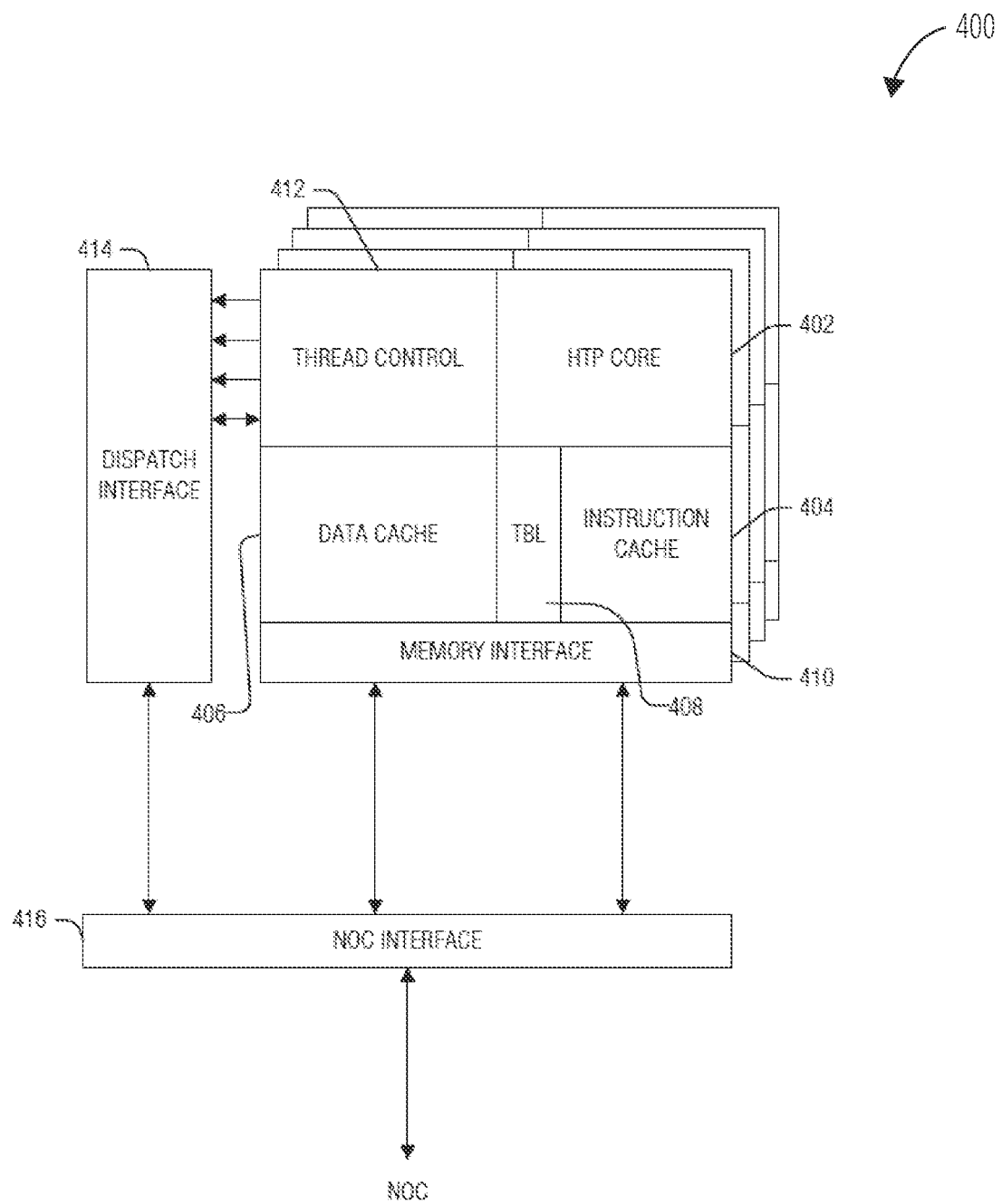
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
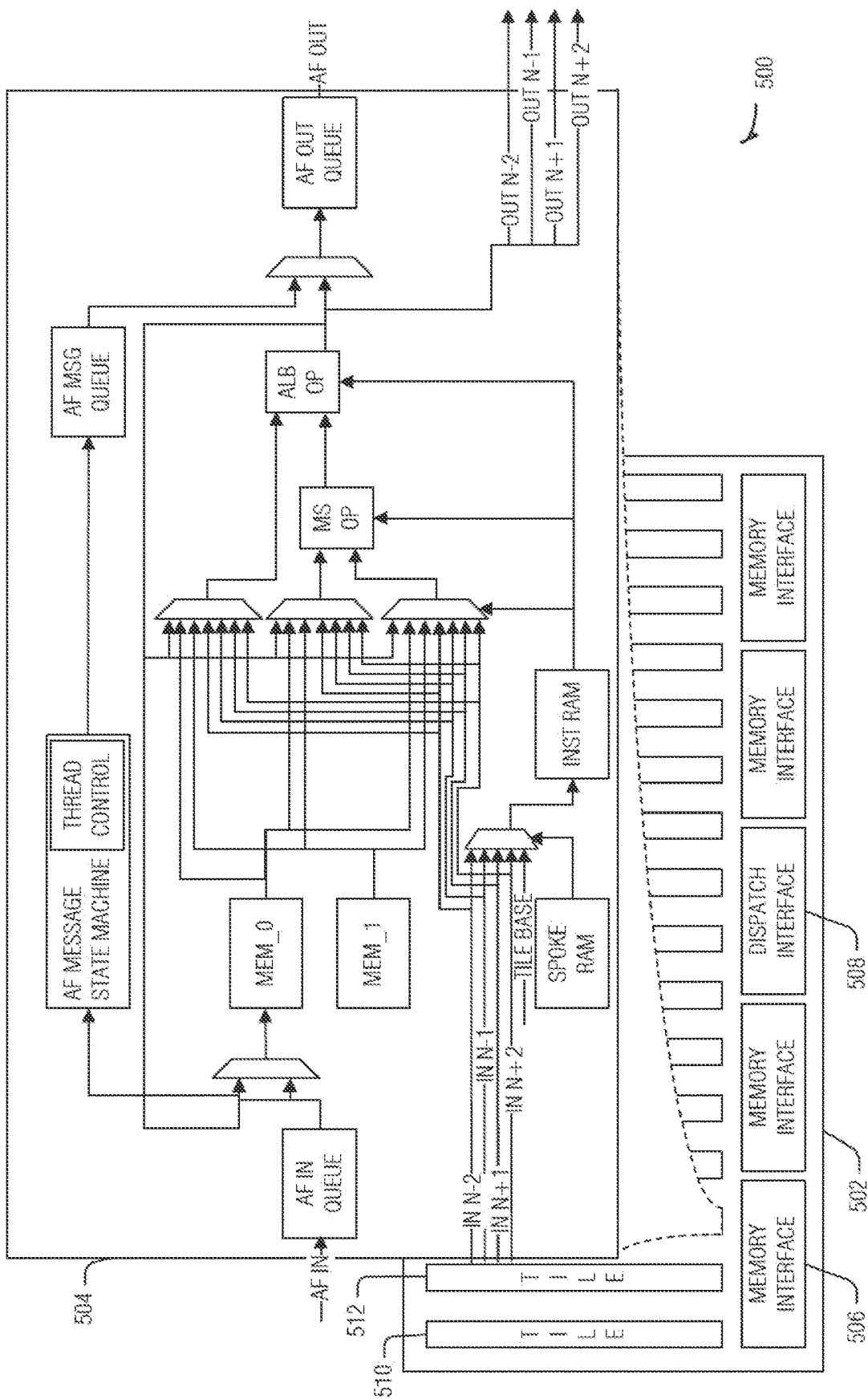
FIG. 5 illustrates an example of a representation of a hybrid threading fabric (HTF) of a memory-compute device, according to an embodiment.

FIG. 5 illustrates an example of a representation of a hybrid threading fabric (HTF), or HTF 500, of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can include one or more compute elements with local memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 5, the tiles comprising the HTF cluster 502 are linearly arranged, and each tile in the cluster can be coupled to one or multiple other tiles in the HTF cluster 502. In the example of FIG. 5, the example tile 504, or Tile N, is coupled to four other tiles, including to a base tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid or other configuration, with each tile similarly coupled to one or several of its nearest neighbors in the grid. Tiles that are provided at an edge of a cluster can optionally have fewer connections to neighboring tiles. For example, Tile N−2, or the base tile 510 in the example of FIG. 5, can be coupled only to the adjacent tile 512 (Tile N−1) and to the example tile 504 (Tile N). Fewer or additional inter-tile connections can similarly be used.

The HTF cluster 502 can further include memory interface modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 5, the tiles in the HTF cluster 502 are coupled using a synchronous fabric (SF). The synchronous fabric can provide communication between a particular tile and its neighboring tiles in the HTF cluster 502, as described above. Each HTF cluster 502 can further include an asynchronous fabric (AF) that can provide communication among, e.g., the tiles in the cluster, the memory interfaces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous domain pipeline in a tile, the control information can arrive at a tile a few clock cycles before the data field. Various registers can be provided to help coordinate dataflow timing in the pipeline.

In an example, each tile in the HTF cluster 502 can include multiple memories. Each memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous domain, or can include a result of a load operation such as initiated by another synchronous domain. The tile memory can be read via synchronous data path instruction execution in the synchronous domain.

In an example, each tile in an HTF cluster 502 can have a dedicated instruction RAM (INST RAM). In an example of an HTF cluster 502 with sixteen tiles, and instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs, and can support nested looping kernels.

The synchronous fabric can allow multiple tiles to be pipelined, such as without a need for data queuing. Tiles that participate in a synchronous domain can, for example, act as a single pipelined data path. A first or base tile (e.g., Tile N−2, in the example of FIG. 5) of a synchronous domain can initiate a thread of work through the pipelined tiles. The base tile can be responsible for starting work on a predefined cadence referred to herein as a Spoke Count. For example, if the Spoke Count is 3, then the base tile can initiate work every third clock cycle.

In an example, the synchronous domain comprises a set of connected tiles in the HTF cluster 502. Execution of a thread can begin at the domain's base tile and can progress from the base tile, via the synchronous fabric, to other tiles in the same domain. The base tile can provide the instruction to be executed for the first tile. The first tile can, by default, provide the same instruction for the other connected tiles to execute. However, in some examples, the base tile, or a subsequent tile, can conditionally specify or use an alternative instruction. The alternative instruction can be chosen by having the tile's data path produce a Boolean conditional value, and then can use the Boolean value to choose between an instruction set of the current tile and the alternate instruction.

The asynchronous fabric can be used to perform operations that occur asynchronously relative to a synchronous domain. Each tile in the HTF cluster 502 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1

(MEM_1). Control messages can be configured to control thread creation, to free resources, or to issue external memory references.

A tile in the HTF cluster 502 can perform various compute operations for the HTF. The compute operations can be performed by configuring the data path within the tile. In an example, a tile includes two functional blocks that perform the compute operations for the tile: a Multiply and Shift Operation block (MS OP) and an Arithmetic, Logical. and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the base tile input) is the primary input for each clock cycle. The Spoke RAM read address input can originate at a counter that counts from zero to Spoke Count minus one. In an example, different spoke counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

FIG. 6A and FIG. 6B illustrate generally an example of a chiplet system that can be used to implement one or more aspects of the CNM system 102. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 6A and FIG. 6B illustrate generally an example of a chiplet system, according to an embodiment. FIG. 6A is a representation of the chiplet system 602 mounted on a peripheral board 604, that can be connected to a broader computer system by a peripheral component interconnect express (PCIe), for example. The chiplet system 602 includes a package substrate 606, an interposer 608, and four chiplets, an application chiplet 610, a host interface chiplet 612, a memory controller chiplet 614, and a memory device chiplet 616. Other systems can include many additional chiplets to provide additional functionalities as will be apparent from the following discussion. The package of the chiplet system 602 is illustrated with a lid or cover 618, though other packaging techniques and structures for the chiplet system can be used. FIG. 6B is a block diagram labeling the components in the chiplet system for clarity.

The application chiplet 610 is illustrated as including a chiplet system NOC 620 to support a chiplet network 622 for inter-chiplet communications. In example embodiments the chiplet system NOC 620 can be included on the application chiplet 610. In an example, the first NOC 118 from the example of FIG. 1 can be defined in response to selected support chiplets (e.g., host interface chiplet 612, memory controller chiplet 614, and memory device chiplet 616) thus enabling a designer to select an appropriate number or chiplet network connections or switches for the chiplet system NOC 620. In an example, the chiplet system NOC 620 can be located on a separate chiplet, or within the interposer 608. In examples as discussed herein, the chiplet system NOC 620 implements a chiplet protocol interface (CPI) network.

In an example, the chiplet system 602 can include or comprise a portion of the first memory-compute node 104 or the first memory-compute device 112. That is, the various blocks or components of the first memory-compute device 112 can include chiplets that can be mounted on the peripheral board 604, the package substrate 606, and the interposer 608. The interface components of the first memory-compute device 112 can comprise, generally, the host interface chiplet 612, the memory and memory control-related components of the first memory-compute device 112 can comprise, generally, the memory controller chiplet 614, the various accelerator and processor components of the first memory-compute device 112 can comprise, generally, the application chiplet 610 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 622. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 622.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 608. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 610, provides a sender, such as the memory controller chiplet 614, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 6A includes a chiplet mesh network 624 that uses a direct, chiplet-to-chiplet technique without a need for the chiplet system NOC 620. The chiplet mesh network 624 can be implemented in CPI, or another chiplet-to-chiplet protocol. The chiplet mesh network 624 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system can be through a desired interface (for example, a PCIe interface). Such an external interface can be implemented, in an example, through the host interface chiplet 612, which in the depicted example, provides a PCIe interface external to chiplet system. Such dedicated chiplet interfaces 626 are generally employed when a convention or standard in the industry has converged on such an interface. The illustrated example of a Double Data Rate (DDR) interface connecting the memory controller chiplet 614 to a dynamic random access memory (DRAM) memory device chiplet 616 is just such an industry convention.

Of the variety of possible support chiplets, the memory controller chiplet 614 is likely present in the chiplet system due to the near omnipresent use of storage for computer processing as well as sophisticated state-of-the-art for memory devices. Thus, using memory device chiplets 616 and memory controller chiplets 614 produced by others gives chiplet system designers access to robust products by sophisticated producers. Generally, the memory controller chiplet 614 provides a memory device-specific interface to read, write, or erase data. Often, the memory controller chiplet 614 can provide additional features, such as error detection, error correction, maintenance operations, or atomic operator execution. For some types of memory, maintenance operations tend to be specific to the memory device chiplet 616, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 614. In other chiplet systems, the atomic operators can be performed by other chiplets. For example, an atomic operator of "increment" can be specified in a command by the application chiplet 610, the command including a memory address and possibly an increment value. Upon receiving the command, the memory controller chiplet 614 retrieves a number from the specified memory address, increments the number by the amount specified in the command, and stores the result. Upon a successful completion, the memory controller chiplet 614 provides an indication of the command success to the application chiplet 610. Atomic operators avoid transmitting the data across the chiplet mesh network 624, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 614.

The memory device chiplet 616 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 616 as a chiplet, however, the device can reside elsewhere, such as in a different package on the peripheral board 604. For many applications, multiple memory device chiplets can be provided. In an example, these memory device chiplets can each implement one or multiple storage technologies, and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 614 can serve to coordinate operations between multiple memory chiplets in the chiplet system 602, for example, to use one or more memory chiplets in one or more levels of cache storage, and to use one or more additional memory chiplets as main memory. The chiplet system 602 can include multiple memory controller chiplet 614 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 7:
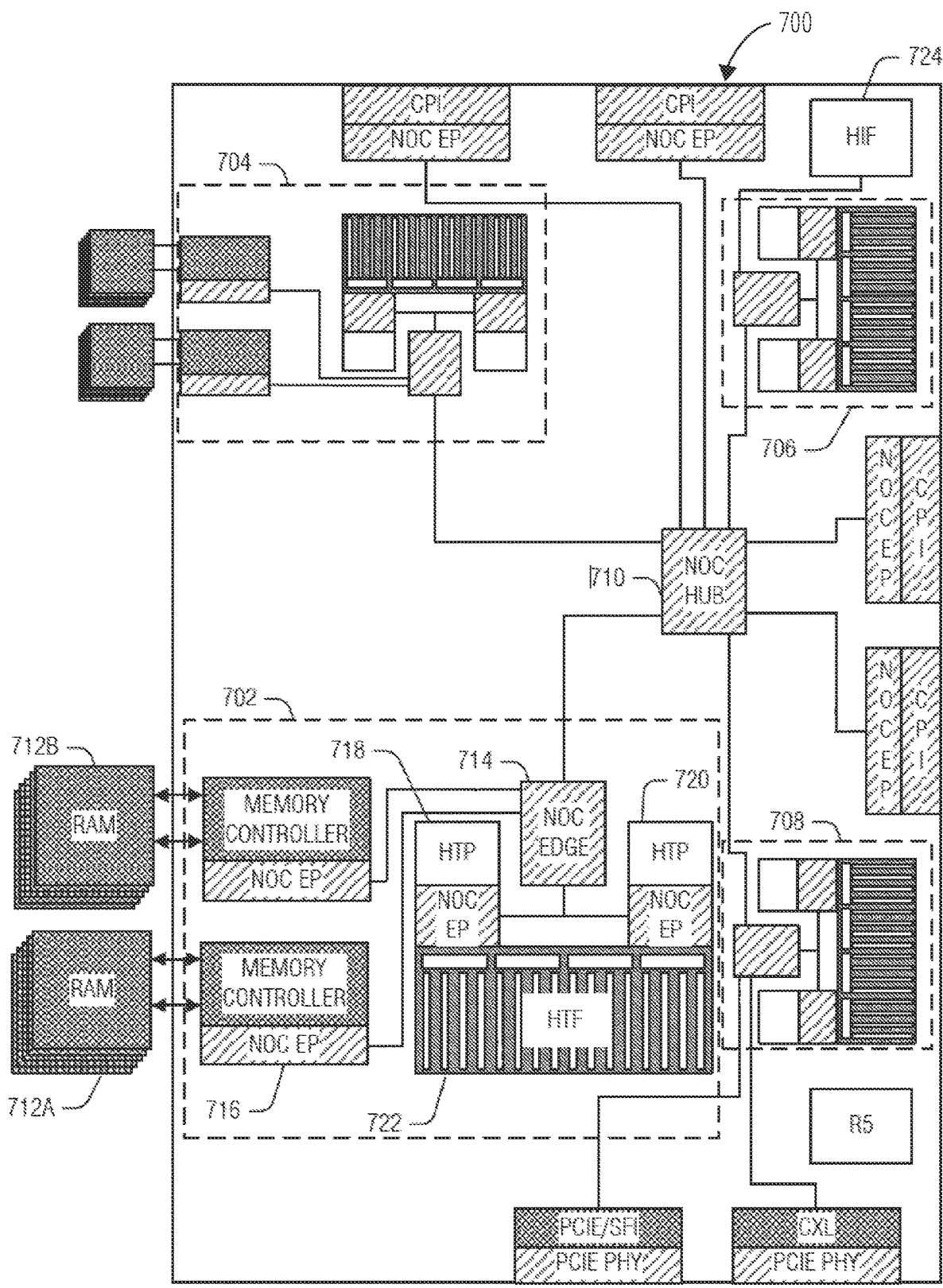
FIG. 7 illustrates generally an example of a chiplet-based implementation for a memory-compute device, according to an embodiment.

FIG. 7 illustrates generally an example of a chiplet-based implementation for a memory-compute device, according to an embodiment. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 602 from FIG. 6A and FIG. 6B.

The example of FIG. 7 includes a first CNM package 700 comprising multiple chiplets. The first CNM package 700 includes a first chiplet 702, a second chiplet 704, a third chiplet 706, and a fourth chiplet 708 coupled to a CNM NOC hub 710. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 7, the first chiplet 702 includes a first NOC hub edge 714 coupled to the CNM NOC hub 710. The other chiplets in the first CNM package 700 similarly include NOC hub edges or endpoints. The switches in the NOC hub edges facilitate intra-chiplet, or intra-chiplet-system, communications via the CNM NOC hub 710.

The first chiplet 702 can further include one or multiple memory controllers 716. The memory controllers 716 can correspond to respective different NOC endpoint switches interfaced with the first NOC hub edge 714. In an example, the memory controller 716 comprises the memory controller chiplet 614 or comprises the memory controller 130, or comprises the memory subsystem 200, or other memory-compute implementation. The memory controllers 716 can be coupled to respective different memory devices, for example including a first external memory module 712a or a second external memory module 712b. The external memory modules can include, e.g., GDDR6 memories that can be selectively accessed by the respective different chiplets in the system.

The first chiplet 702 can further include a first HTP chiplet 718 and second HTP chiplet 720, such as coupled to the first NOC hub edge 714 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 722. The HTF chiplet 722 can correspond to an HTF accelerator, such as the HTF 142 from the example of FIG. 1, or the HTF 500 from the example of FIG. 5.

The CNM NOC hub 710 can be coupled to NOC hub instances in other chiplets or other CNM packages by way of various interfaces and switches. For example, the CNM NOC hub 710 can be coupled to a CPI interface by way of multiple different NOC endpoints on the first CNM package 700. Each of the multiple different NOC endpoints can be coupled, for example, to a different node outside of the first CNM package 700. In an example, the CNM NOC hub 710 can be coupled to other peripherals, nodes, or devices using CTCPI or other, non-CPI protocols. For example, the first CNM package 700 can include a PCIe scale fabric interface (PCIE/SFI) or a CXL interface (CXL) configured to interface the first CNM package 700 with other devices. In an example, devices to which the first CNM package 700 is coupled using the various CPI, PCIe, CXL, or other fabric, can make up a common global address space.

In the example of FIG. 7, the first CNM package 700 includes a host interface 724 (HIF) and a host processor (R5). The host interface 724 can correspond to, for example, the HIF 120 from the example of FIG. 1. The host processor, or R5, can correspond to the internal host processor 122 from the example of FIG. 1. The host interface 724 can include a PCI interface for coupling the first CNM package 700 to other external devices or systems. In an example, work can be initiated on the first CNM package 700, or a tile cluster within the first CNM package 700, by the host interface 724. For example, the host interface 724 can be configured to command individual HTF tile clusters, such as among the various chiplets in the first CNM package 700, into and out of power/clock gate modes.

Figure 8:
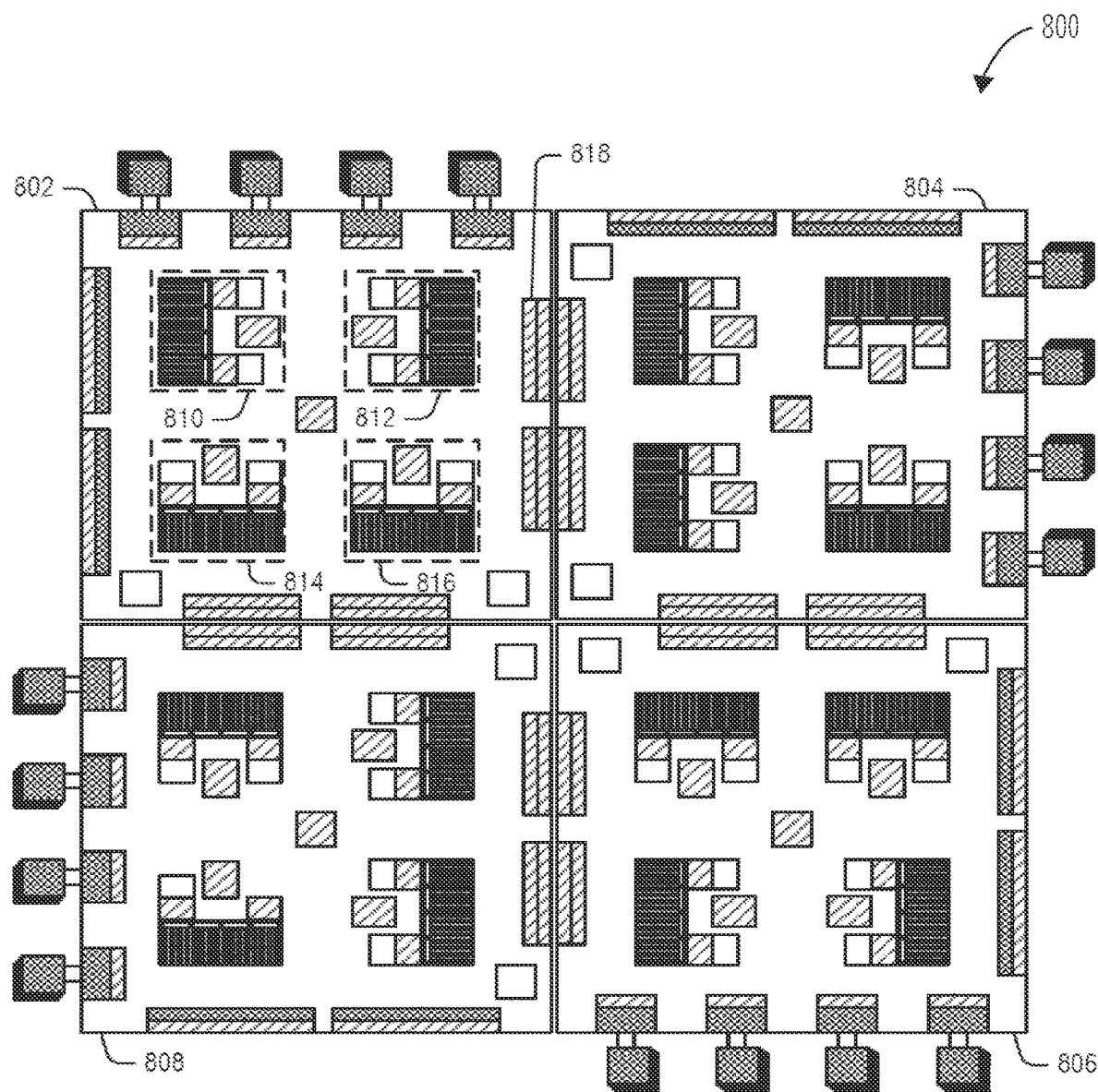
FIG. 8 illustrates an example tiling of memory-compute device chiplets, according to an embodiment.

FIG. 8 illustrates an example tiling of memory-compute devices, according to an embodiment. In FIG. 8, a tiled chiplet example 800 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 800 includes, as one or multiple of its compute-near-memory (CNM) clusters, instances of the first CNM package 700 from the example of FIG. 7. For example, the tiled chiplet example 800 can include a first CNM cluster 802 that includes a first chiplet 810 (e.g., corresponding to the first chiplet 702), a second chiplet 812 (e.g., corresponding to the second chiplet 704), a third chiplet 814 (e.g., corresponding to the third chiplet 706), and a fourth chiplet 816 (e.g., corresponding to the fourth chiplet 708). The chiplets in the first CNM cluster 802 can be coupled to a common NOC hub, which in turn can be coupled to a NOC hub in an adjacent cluster or clusters (e.g., in a second CNM cluster 804 or a fourth CNM cluster 808).

In the example of FIG. 8, the tiled chiplet example 800 includes the first CNM cluster 802, the second CNM cluster 804, a third CNM cluster 806, and the fourth CNM cluster 808. The various different CNM chiplets can be configured in a common address space such that the chiplets can allocate and share resources across the different tiles. In an example, the chiplets in the cluster can communicate with each other. For example, the first CNM cluster 802 can be communicatively coupled to the second CNM cluster 804 via an inter-chiplet CPI interface 818, and the first CNM cluster 802 can be communicatively coupled to the fourth CNM cluster 808 via another or the same CPI interface. The second CNM cluster 804 can be communicatively coupled to the third CNM cluster 806 via the same or other CPI interface, and so on.

In an example, one of the compute-near-memory chiplets in the tiled chiplet example 800 can include a host interface (e.g., corresponding to the host interface 724 from the example of FIG. 7) that is responsible for workload balancing across the tiled chiplet example 800. The host interface can facilitate access to host-based command request queues and response queues, such as from outside of the tiled chiplet example 800. The host interface can dispatch new threads of execution using hybrid threading processors and the hybrid threading fabric in one or more of the compute-near-memory chiplets in the tiled chiplet example 800.

The present inventors have recognized, among other things, that a problem to be solved includes reducing latency in computing systems, for example, in performing memory accesses. The problem can further include efficiently using a breadth first search (BFS) algorithm over a large number of nodes, where each node can include local memory stores that are accessible by the same node, or by one or more other nodes, in the system.

The present inventors have recognized that a solution to the latency problem can include or use a cache for each node. For example, in BFS algorithms, the frontier for vertices with a relatively higher degree, or with the most "counts." can be more likely to be accessed during a search. To improve performance, the bottom up (BU) phase of the algorithm can use a local cache to store the results of remote accesses to frontier information corresponding to the highest degree vertices. In an example, there can be a software-implemented cache of, for example, 1024×64-bit words per memory-compute device in the system. The cache can be empty at the start of a BU iteration. At a first node, a first access of one of the high-degree elements during execution can read the element from a remote location (i.e., a location that is remote from the first node), and then store the element in a local cache at the first node. In this manner, subsequent accesses from the first node, or first memory-compute device, to the same remote location can instead be fulfilled by the local cache of the first node, and can thus reduce or eliminate latency-causing remote access activity.

The present inventors have recognized that latency, in a system using a BFS algorithm over many nodes, can be reduced by organizing around node-local requests. By taking advantage of the data layout of the BFS algorithm's data structures and establishing a relatively small saturating cache for each node, such as for the first 1k fetched requests, a significant difference to bandwidth utilization can be realized. The relatively small, saturating cache can help turn many remote requests into local requests such as without fully reloading on every iteration.

There can be various benefits associated with use of the saturating cache. By caching frontier bits or frontier information of remote nodes of high degree, future requests become local and have relatively high hit rate. The saturating design can be relatively simple in that, for example, only the first several words (e.g., 1024 words) received from neighboring memory-compute devices are entered in the cache. In an example, the cache can be static, that is, without an eviction policy, and can avoid spending execution time on cache balancing. Furthermore, given the cache structure, all frontier information need not be reloaded at the start of execution. This can help save computation resources and time since a BU early-termination condition can trigger early, such as before all of the frontier information is fetched.

Breadth first search, or BFS, can represent a data-intensive workload that traverses a computing graph to identify nodes and levels of connectedness from a starting source node. In the context of the CNM system 102, a graph can comprise the various first memory-compute nodes 104 as vertexes and the scale fabric 106 between the nodes as edges in the graph.

Challenges presented by BFS include, among other things, that a ratio of remote memory accesses to local memory accesses grows proportionally to the number of nodes used, with a corresponding increase in average latency and network throughput requirements. As a result, traditional clusters show poor scalability with increased node counts. Furthermore, using many concurrent threads to mask latency requires significant system throughput. Further still, there can be many memory references to the same location (hot-spotting). Memory access patterns can be data-dependent, and data references can be random, thereby rendering data prefetch relatively unhelpful. Furthermore, balanced distribution of work can be challenging due to large variations in units of work, coupled with inexact estimates of work to be done.

A solution to these and other challenges can include using a hybrid BFS implementation. Various data structures can be used in a hybrid BFS implementation that uses bottom-up and top-down approaches together. In an example, a search graph can be represented using an adjacency list. For each vertex in the graph (e.g., corresponding to a particular node in the CNM system 102), the corresponding neighbor index list can include vertex numbers for all the vertices to which it is connected. During setup, a number of neighbors for each vertex can be calculated and stored in a degree list. The degree list can thus represent a connectedness of nodes in the graph. A parent list can include a result of a search. For example, a parent of a source vertex is itself, and it is the only vertex at a level 0 of a search. For subsequent levels, and for each vertex whose parent value was not previously updated, if there are one or more neighbors that were updated in the previous level, then the parent value is updated to contain the vertex number of one of the neighbors. In an example, a frontier bitmap can include information about whether a parent of a given vertex was found during a previous level of the search. In an example, the frontier bitmap can be read-only for the duration of a bottom-up iteration of a search.

Figure 9:
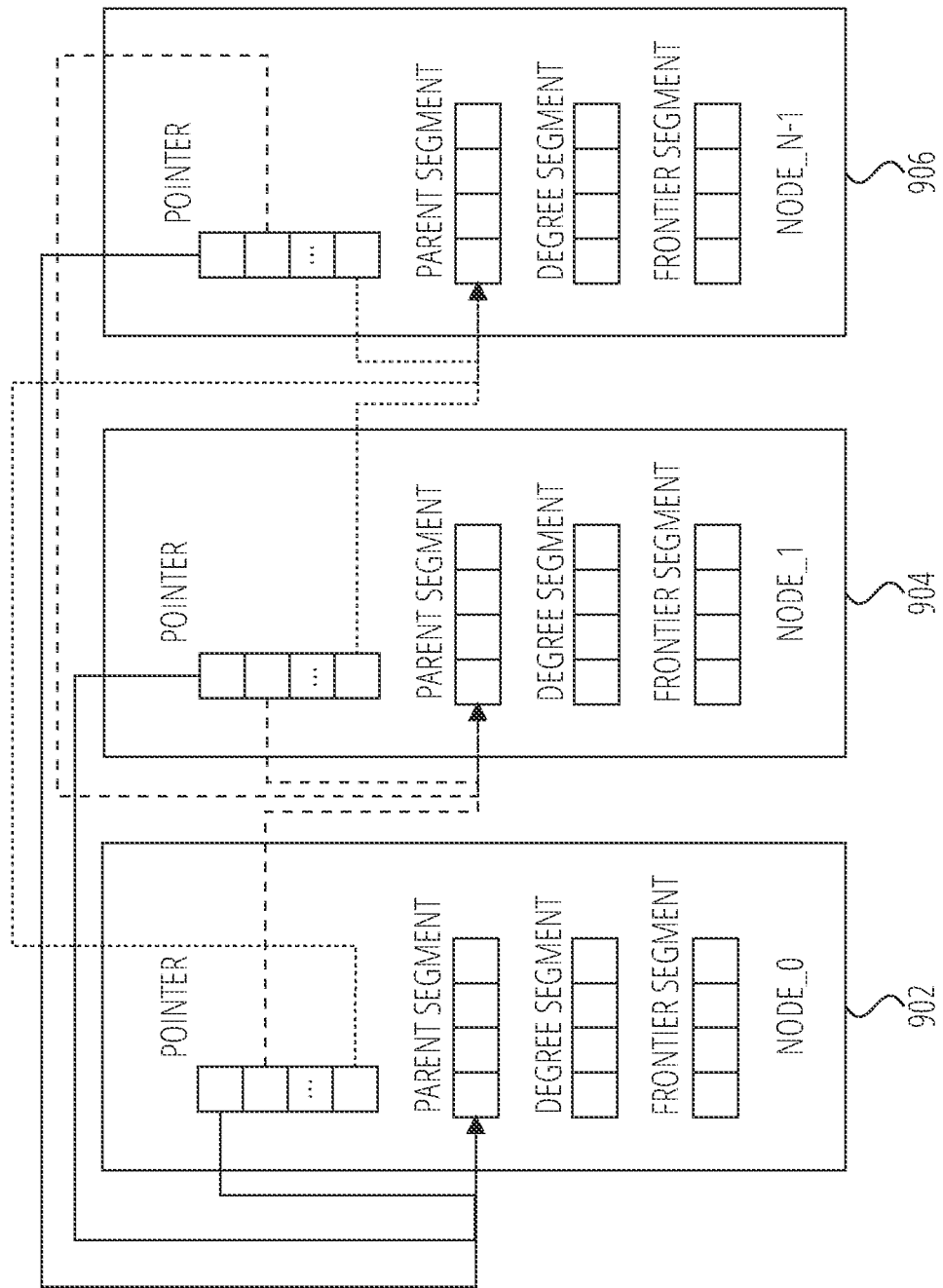
FIG. 9 illustrates generally an example of data structures distributed across different memory-compute devices.

FIG. 9 illustrates generally an example of data structures distributed across different memory-compute devices. For example. FIG. 9 shows multiple different nodes that can comprise a portion of an N-node compute-near-memory system, such as the CNM system 102. FIG. 9 includes a first node 902 (Node_0), a second node 904 (Node_1), and a Nth node 906 (Node_N−1). Fewer or additional nodes can similarly be used. The nodes can be configured to communicate, such as to satisfy read and write requests originating at ones of the nodes in the system, using a fabric such as the scale fabric 106.

In an example, due to the distributed nature of computation on a cluster of nodes, such as using the CNM system 102, data can be placed or distributed according to the representation in FIG. 9. Allocations of a neighbor index list, degree list, parent list and frontier can be distributed evenly across all the nodes in the system as segmented vectors. A segmented vector can be a single vector and can be accessed as a normal vector for convenience. However, a segmented vector can be partitioned into segments of equal size based on a number of nodes in the system, and each segment can be physically allocated on a different node. A list of segment pointers can be used to access each segment of the allocation.

Access to an element of a segmented vector from a processing core of a node on which the segment is also located is referred to herein as a local access. Otherwise, access to an element from another, remote node is referred to herein as a remote access. Because the latency and demand placed on a memory system by a local access is smaller than that of a remote access, minimizing the number of remote accesses can be a primary consideration in designing an efficient search algorithm.

The example of FIG. 9 illustrates various local and remote accesses. For example, a first pointer on the first node 902 can point to a portion of a parent segment on the first node 902, and a second pointer on the first node 902 can point to a portion of a parent segment on the second node 904 or the Nth node 906. Similarly, pointers on the second node 904 can point to portions of a node-local parent segment or a remote parent segment, such as on the first node 902 or the Nth node 906 or elsewhere in the CNM system 102.

A degree of a vertex or node, or a number of edges connected to that vertex, can be used to estimate an amount of work associated with the particular vertex. To achieve a balanced workload across all the computational elements in the system, vertices can be assigned to particular nodes such that the sum of the degree counts of vertices assigned to each node are approximately equal.

In contrast with a Top Down algorithm, which attempts to add new vertices to a frontier bitmap by processing each element of the neighbor list associated with elements found at the previous level, a bottom-up algorithm considers each vertex based on whether a parent was found in a previous level. The bottom-up algorithm processes its neighbor list searching for a vertex for which the parent was found at the previous level.

A frontier bitmap can indicate vertices for which a parent was found during searches at all prior levels. Vertices for which a parent is not found have the corresponding bit in the frontier bitmap set to 1. For each of these vertices, each of its neighbors can be considered until a neighbor is found whose corresponding frontier bit is 0, or whose corresponding value in the frontier bitmap is 0. When such a neighbor is found, the parent segment can be updated by setting the parent of the current vertex to an ID of the neighbor. The next frontier, or adjacent node or nodes, can be updated by setting the bit for the current vertex ID to 0. The list can be processed using trailing zero count instructions to skip over consecutive unmarked nodes.

Figure 10:
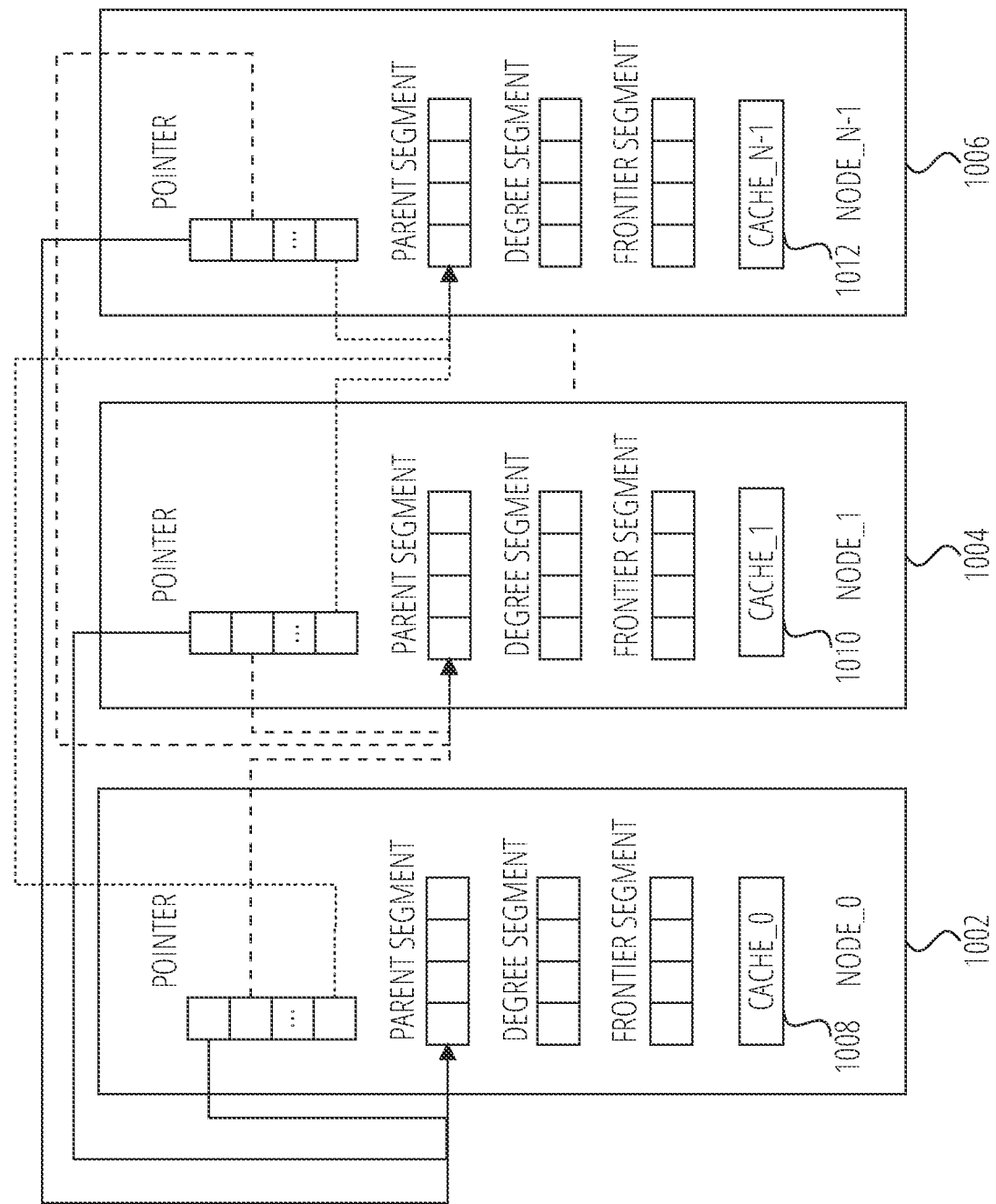
FIG. 10 illustrates generally an example of data structures distributed across different memory-compute devices, and each of the devices includes a saturating cache.

During bottom-up processing, for example, each node can process vertices for which the parent, degree, and neighbor list accesses are local to that same node, and remote accesses can be to the frontier for each of the neighbors of a vertex or node for which a parent was not previously found. Accordingly, a number of remote accesses can be minimized to thereby enhance search performance. FIG. 10 illustrates generally an example of data structures distributed across different memory-compute devices, and each of the devices includes a saturating cache. FIG. 10 includes multiple different nodes that can comprise a portion of an N-node compute-near-memory system, such as the CNM system 102. FIG. 10 includes a first node 1002 (Node_0), a second node 1004 (Node_1), and a Nth node 1006 (Node_N−1). Fewer or additional nodes can similarly be used. The nodes can be configured to communicate, such as to satisfy read and write requests originating at various nodes in the system, using a fabric such as the scale fabric 106.

The respective nodes in the example of FIG. 10 can be similarly configured to the nodes in the example of FIG. 9. That is, each node can be configured to communicate with other nodes in the system, and each node can have or use vector-based memory. Unlike the example nodes from FIG. 9, each of the example nodes in FIG. 10 includes a respective local software cache. For example, the first node 1002 includes a first node-local cache 1008, the second node 1004 includes a second node-local cache 1010, and the Nth node 1006 includes a Nth node-local cache 1012. The different node-local caches can be software-implemented saturating caches. In an example, the caches can be populated during a bottom-up phase of a BFS algorithm. Each of the different node-local caches can be populated using different information, such as depending on the particular read requests issued by each of the respective different nodes.

In an example, each of the first node-local cache 1008, the second node-local cache 1010, and the Nth node-local cache 1012 is the same size. Each cache can be configured to have N different blocks corresponding to the N different nodes in the system, such as the CNM system 102. In an example, each block can be configured to store 1024×64 bit words, and each block can be populated using information received from the respective different nodes.

The various cache blocks can be populated when remote accesses are first made. For example, a first portion of the first node-local cache 1008 can be populated with information (e.g., comprising 1024×64 bits) received from one or more segments on the second node 1004 when such information is first accessed by the first node 1002. Subsequent requests from the first node 1002 for the same information can be retrieved from the first portion of the first node-local cache 1008, such as instead of from a location at the second node 1004. Similarly, a second portion of the first node-local cache 1008 can be populated with other information received from one or more segments on the Nth node 1006 when such other information is first accessed by the first node 1002. Subsequent requests from the first node 1002 for the second information can be retrieved from the second portion of the first node-local cache 1008, and so on.

Figure 11:
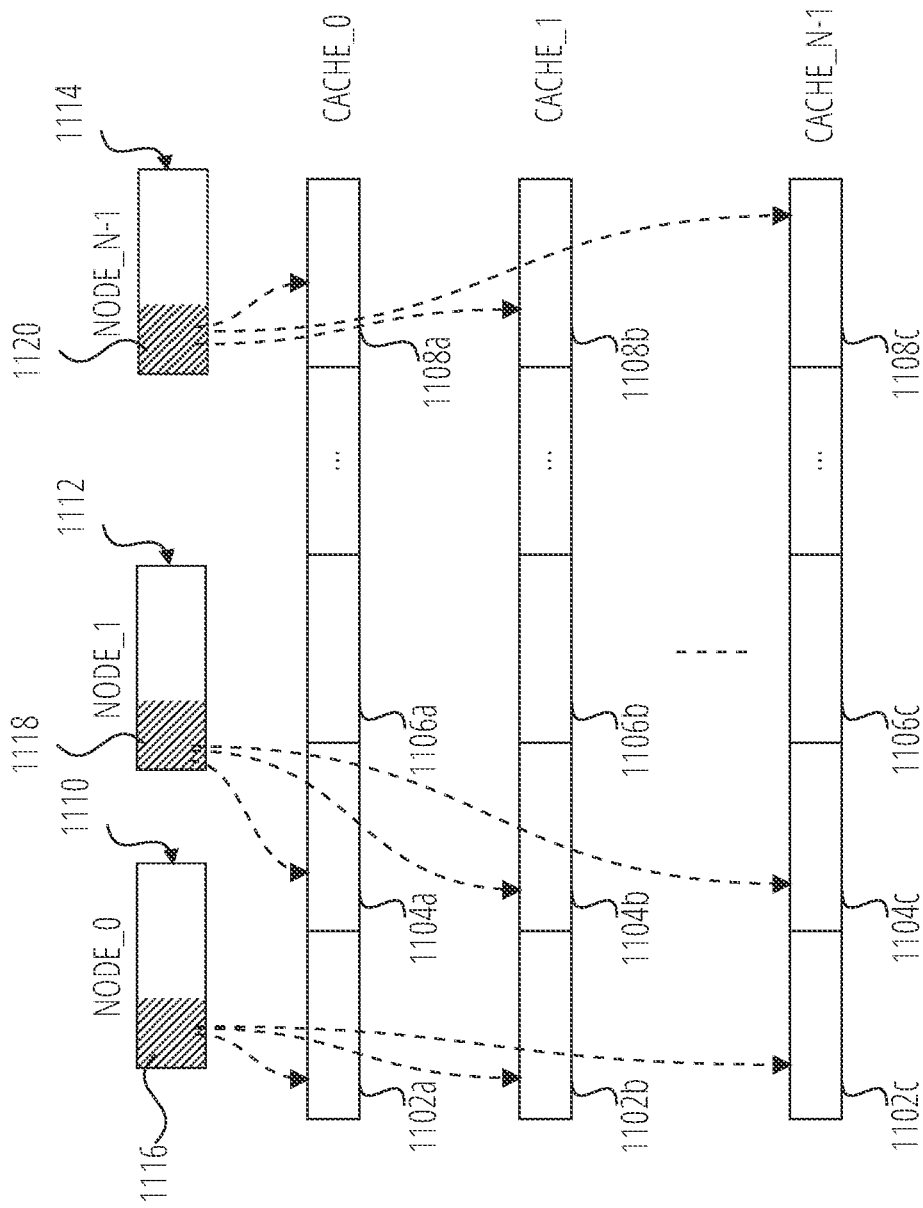
FIG. 11 illustrates generally an example of mapping frontier information from different memory-compute devices to respective different saturating caches.

FIG. 11 illustrates generally an example of mapping frontier information from different memory-compute devices to respective different saturating caches. The example includes a representation of the first node-local cache 1008 (cache_0), the second node-local cache 1010 (cache_1), and the Nth node-local cache 1012 (cache_N−1), such as corresponding to the example of FIG. 10. Each of the node-local caches can comprise N different cache blocks, where N corresponds to a number of nodes in the system that includes the first node 1002, the second node 1004, and the Nth node 1006. In an example, each of the cache blocks can be the same size. In other examples, the caches can be differently sized.

Generally, frontier information corresponding to vertices with the highest degree counts can be most likely to be accessed during a search. To improve performance, a bottom-up algorithm can use the node-local caches to store results of remote frontier accesses corresponding to the highest degree vertices. In an example, the node-local caches can comprise N blocks respectively corresponding to N different nodes in a system, and each block can receive up to 1024×64-bit words.

In an example, the cache of a particular node, such as the first node 1002, can be empty at initialization of a bottom-up search initiated by compute resources on the first node 1002. A first access of one of the high degree elements can read target information from its remote location (i.e., at a node outside of the first node 1002, such as at the second node 1004, the Nth node 1006, or at another node in the CNM system 102), and then store the target information in the first node-local cache 1008. Subsequent requests by the first node 1002 for the same target information can be fulfilled by the first node-local cache 1008 and therefore obviate further remote accesses.

In an example, the cache can be a saturating cache in that not any and every element may have an opportunity to be cached. Instead, only particular elements (e.g., only the first 1024 elements or words of each remote frontier) may be cached on a read. Elements further or deeper in the frontier (e.g., those elements with index greater than 1024) can bypass the cache. This solution helps ensure that large elements end up cached and compute cycles are not spent on maintaining a cache protocol.

The example of FIG. 11 illustrates graphically how elements from particular nodes can be stored or cached across the same or other nodes in a system. For example, the first node 1002 can include a first node memory device 1110, the second node 1004 can include a second node memory device 1112, and the Nth node 1006 can include a Nth node memory device 1114. Each of the different memory devices can correspond to a different instance of, for example, the first memory device 128 from the example of the first memory-compute device 112 from FIG. 1. The different memory devices can store respective different elements or bits, such as can be used by compute resources on the same or different node. For example, the first node memory device 1110 can comprise first elements 1116 that can be used by the first node 1002 or second node 1004 or other node in the CNM system 102. The first node memory device 1110 can comprise information other than the first elements 1116. The second node memory device 1112 can comprise second elements 1118 that can be used by the first node 1002 or the second node 1004 or other node in the CNM system 102, and so on. In the example of FIG. 11, the Nth node memory device 1114 comprises third elements 1120 stored in memory at the Nth node 1006.

In the example of FIG. 11, the different node-local caches can comprise respective different blocks, such as N different blocks for storing information from N different nodes. For example, the first node-local cache 1008, or cache_0, can include a first block 1102a, a second block 1104a, a third block 1106a, and a Nth block 1108a, such as respectively corresponding to each of N different nodes in the memory-compute system that includes the N nodes. In the example of FIG. 11, the first block 1102a can be configured to store the first elements 1116 from the first node memory device 1110, such as from the first node 1002. The first elements 1116 can represent the first information (e.g., comprising frontier bits) accessed by the first node 1002 from memory stores on the first node 1002. In an example, a size of the first block 1102a (or one or more other blocks) can be the same as the size of the elements to be cached or stored in the first block 1102a. For example, the first elements 1116 can comprise 1024 elements and the first block 1102a can be correspondingly sized to store 1024 elements.

In an example, the first block 1102a can be populated with the first elements 1116 during a BFS process, such as during a bottom-up phase of the BFS process. The second block 1104a can be configured to store the second elements 1118 from the second node memory device 1112, such as can be received from the second node 1004. The second elements 1118 can represent the first information (e.g., frontier bits) accessed by the first node 1002 from memory stores on the second node 1004, and the second elements 1118 can represent less than all of the information in the second node memory device 1112. Subsequent requests from the first node 1002 for the second elements 1118 can be fulfilled using the first node-local cache 1008 or cache_0, such as using the information at the second block 1104a.

In the example of FIG. 11, the same information (e.g., frontier bits) from the first node memory device 1110 can be used to populate the first block 1102a on the first node-local cache 1008, and to populate the first block 1102b on the second node-local cache 1010, and to populate the first block 1102c on the Nth node-local cache 1012. That is, the same information, such as the first elements 1116, can be used to fulfill initial requests from each of the different nodes.

In other examples, different information can be used to populate corresponding cache blocks on different nodes, such as corresponding to frontier information for those particular nodes. For example, the Nth node memory device 1114 can comprise third elements 1120. With respect to the first node 1002, the frontier information can comprise the third elements 1120, and thus a Nth block 1108a of the first node-local cache 1008 can be populated with the third elements 1120 when such elements are first accessed by the first node 1002. With respect to the second node 1004, the frontier information can comprise the third elements 1120, and thus a Nth block 1108b of the second node-local cache 1010 can be populated with the third elements 1120. In an example, a Nth block 1108c of the third Nth node-local cache 1012 can be vacant or unused, such as unless or until the third Nth node 1006 accesses information from the Nth node memory device 1114, such as information corresponding to the third elements 1120.

Fewer than all of the elements or frontier information from a particular memory device may be used to populate a particular node-local cache. In a representative example, the first node memory device 1110 can comprise the first elements 1116, such as can comprise 1024×64 bit words. During a particular iteration of a search, and depending on the connectivity details for the particular iteration, some but not necessarily all of the 1024×64 bit words from the first elements 1116 may be cached at the node responsible for the search. For example, the second node 1004 can perform a search that returns fewer than all of the first elements 1116, and the returned elements can be stored in the first block 1102b of the second node-local cache 1010 (cache_1). Since the first block 1102b can be sized to receive up to 1024×64 bit words, a portion of the first block 1102b may be unused. Similarly, the third node 1006 can perform a search that returns fewer than all of the first elements 1116, and the returned elements can be stored in the first block 1102c of the Nth node-local cache 1012 (cache_N−1). The returned elements to each of the respective different node-local caches may be or may not be the same elements.

Figure 12:
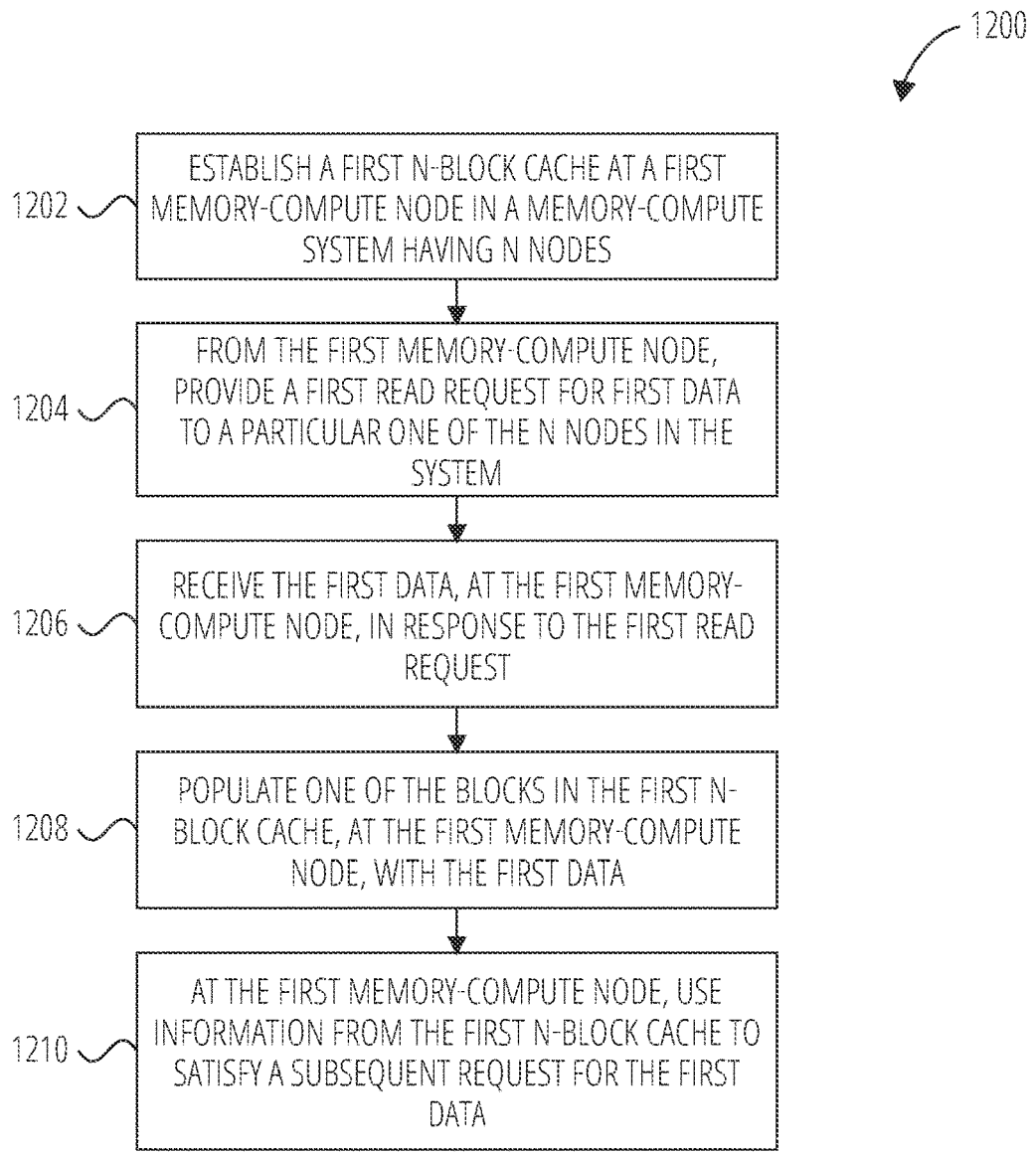
FIG. 12 illustrates generally an example that can include establishing and populating node-based saturating caches.

FIG. 12 illustrates generally a first method 1200 that can include establishing and populating node-based saturating caches. The first method 1200 can be performed using multiple nodes in a compute-near-memory system, such as using multiple different instances of the first memory-compute device 112 in the CNM system 102.

At step 1202, the first method 1200 can include establishing a first N-block cache at a first memory-compute node in a memory-compute system, and the system can comprise N nodes. For example, step 1202 can include establishing the first node-local cache 1008 at the first node 1002, and the first node 1002 can comprise one of N different nodes in the CNM system 102, step 1202 can include establishing N blocks in the cache, and the blocks can be equally or unequally sized. In an example, each of the N blocks can be configured to accommodate about 1024 different elements or words, such as can correspond to information received from N (or N−1) respective different nodes in the system. In an example, step 1202 can include establishing a first block (e.g., the first block 1102a) in the N-block cache to store frontier information from the first node 1002, establishing a second block (e.g., the second block 1104a) in the N-block cache to store frontier information from the second node 1004, and so on.

At step 1204, the first method 1200 can include providing, from the first memory-compute node, a first read request for first data. The first read request can be provided to a particular one of the N different nodes in the system. For example, the first data can be stored in a second memory-compute node in the system, and therefore the first read request can include sending a request for the first data to the second memory-compute node. At step 1206, the first method 1200 can include receiving the first data, at the first memory-compute node, in response to the request provided at step 1204. In an example, step 1204 and/or step 1206 can include or use a compute fabric, such as the scale fabric 106, to exchange information between the different nodes.

At step 1208, the first method 1200 can include populating at least one of the blocks in the N-block cache at the first memory-compute node with the first data received at step 1206. For example, if the first data corresponds to a second node in the system, then step 1208 can include populating a particular block in the N-block cache, established at the first node at step 1202, that corresponds to the second node.

At step 1210, the first method 1200 can include using information from the N-block cache. For example, step 1210 can include using the first memory-compute node to request the same first data that was requested at step 1204. However, since the first data was stored in the node-local cache of the first memory-compute node, the read request for the first data can be fulfilled using the information from node-local cache. For example, if the first data is stored in the particular block of the N-block cache, locally to the first memory-compute node, then the request at step 1210 can be fulfilled using information retrieved locally from the particular block, rather than remotely from a different node.

Figure 13:
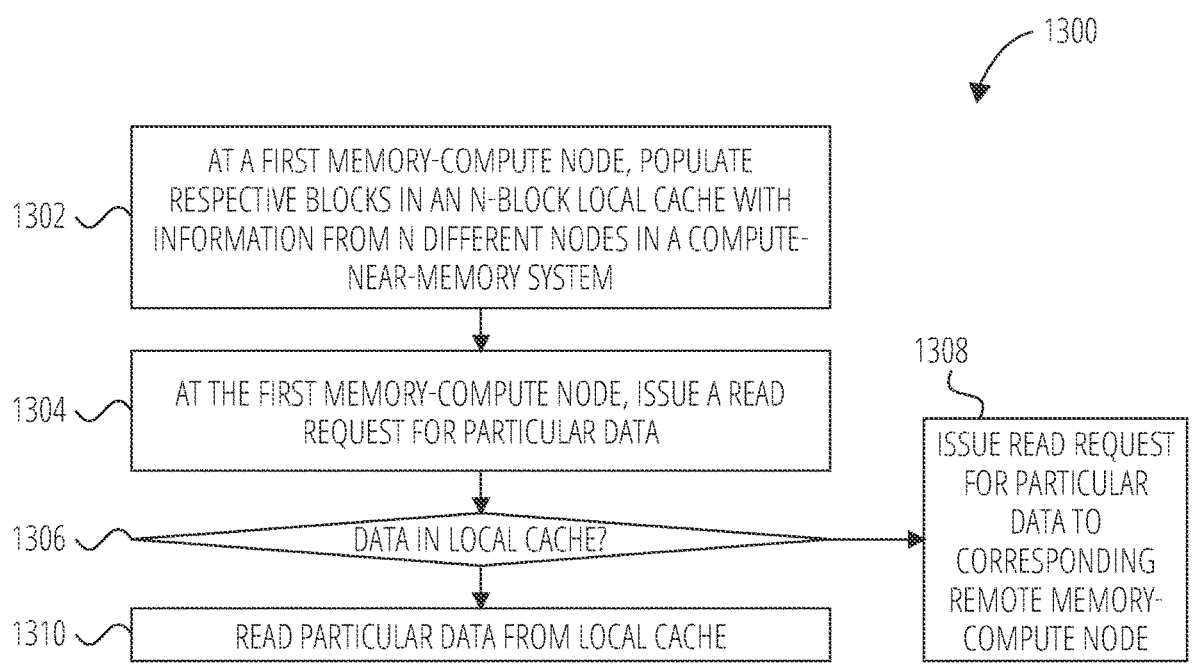
FIG. 13 illustrates generally an example that can include using information from a local cache to satisfy read requests.

FIG. 13 illustrates generally a second method 1300 that can include conditionally using information from a local cache to satisfy read requests. The second method 1300 can be performed using one or more nodes in a compute-nearmemory system, such as using multiple different instances of the first memory-compute device 112 in the CNM system 102.

At step 1302, the second method 1300 can include establishing an N-block cache at a first memory-compute node of a compute-near-memory system. For example, step 1302 can comprise or correspond to the example of FIG. 12, such as at step 1202 through step 1208. Following step 1302, the N-block cache, or node-local cache at the first memory-compute node, can comprise information received from one or more of the same node or other nodes in the system, with such information segmented or divided in the cache according to its source location (see, e.g., the example of FIG. 11, for examples of how information from different nodes can be distributed or stored in portions of different node-local caches in a system of nodes).

At step 1304, the second method 1300 can include, at the first memory-compute node, issuing a read request for particular data. In an example, step 1304 can include using compute resources at the first node 1002 to prepare or issue a request for the particular data. At decision step 1306, the second method 1300 can include using the compute resources at the first node 1002 to determine whether the particular data requested exists in the node-local cache, such as the cache established at step 1302. If the data exists in the node-local cache then, at step 1310, the second method 1300 can include reading the particular data from the node-local cache. If the data does not exist at the node-local cache, then the second method 1300 can proceed to step 1308. At step 1308, the second method 1300 can include issuing a read request to a remote resource, such as a remote node in the system that comprises the first memory-compute node. For example, step 1308 can include step 1204 from the first method 1200, including providing a read request to a different node in the memory-compute system. Following step 1308, the second method 1300 can include using the information received to populate a portion of the N-block cache at the first memory-compute node such that subsequent requests for the same data can be fulfilled using the cache.

Figure 14:
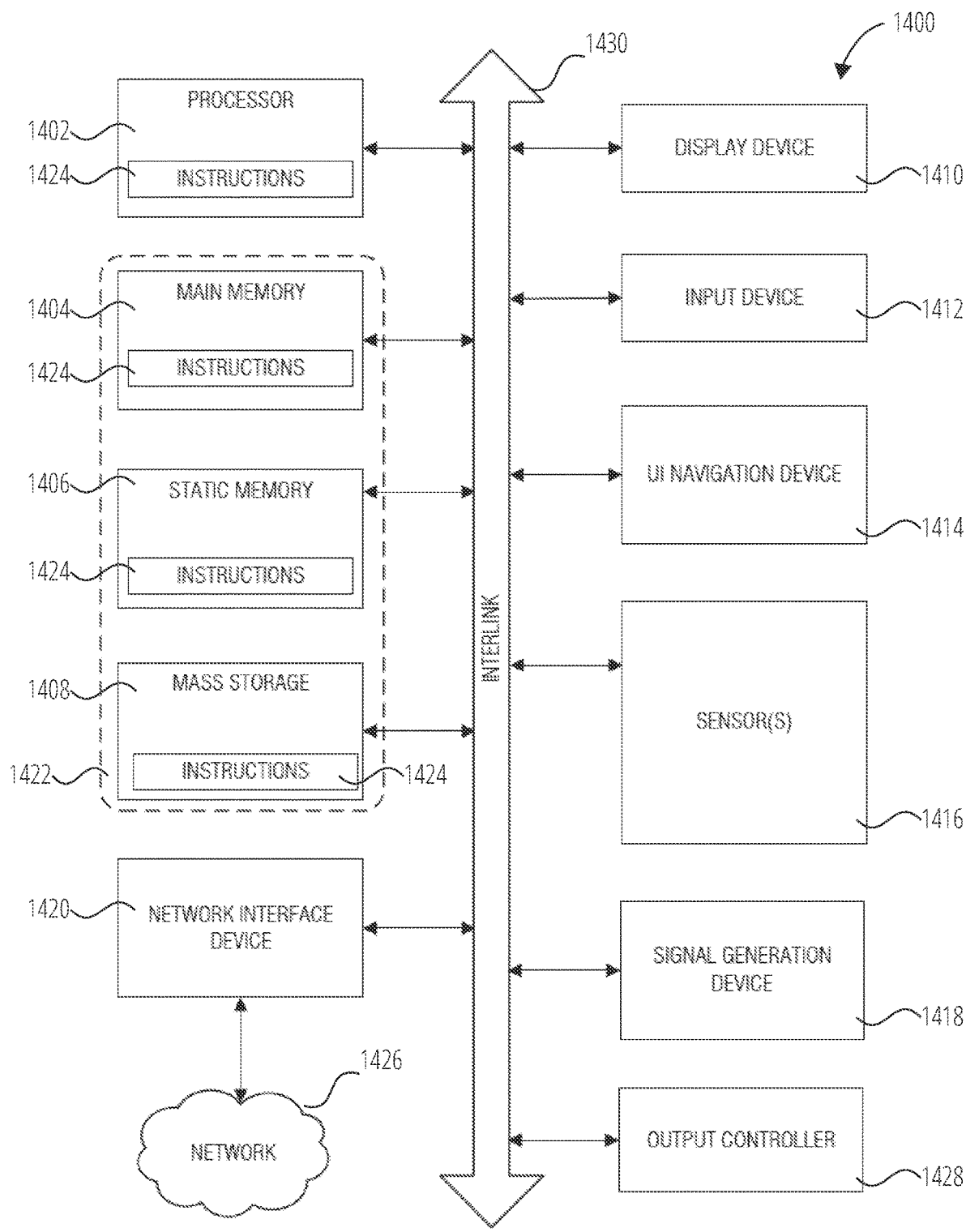
FIG. 14 illustrates a block diagram of an example machine with which, in which, or by which any one or more of the techniques (e.g., methodologies) discussed herein can be implemented.

FIG. 14 illustrates a block diagram of an example machine 1400 with which, in which, or by which any one or more of the techniques (e.g., methodologies) discussed herein can be implemented. Examples, as described herein, can include, or can operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1400.

In alternative embodiments, the machine 1400 can operate as a standalone device or can be connected (e.g., networked) to other machines. In a networked deployment, the machine 1400 can operate in the capacity of a server machine, a client machine, or both in server-client network environments. In an example, the machine 1400 can act as a peer machine in peer-to-peer (P2P) (or other distributed) network environment. The machine 1400 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1400 (e.g., computer system) can include a hardware processor 1402 (e.g., a central processing unit (CPU), a graphics processing unit (GPU), a hardware processor core, or any combination thereof), a main memory 1404, a static memory 1406 (e.g., memory or storage for firmware, microcode, a basic-input-output (BIOS), unified extensible firmware interface (UEFI), etc.), and mass storage device 1408 (e.g., hard drives, tape drives, flash storage, or other block devices) some or all of which can communicate with each other via an interlink 1430 (e.g., bus). The machine 1400 can further include a display device 1410, an alphanumeric input device 1412 (e.g., a keyboard), and a user interface (UI) Navigation device 1414 (e.g., a mouse). In an example, the display device 1410, the input device 1412, and the UI navigation device 1414 can be a touch screen display. The machine 1400 can additionally include a mass storage device 1408 (e.g., a drive unit), a signal generation device 1418 (e.g., a speaker), a network interface device 1420, and one or more sensor(s) 1416, such as a global positioning system (GPS) sensor, compass, accelerometer, or other sensor. The machine 1400 can include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1402, the main memory 1404, the static memory 1406, or the mass storage device 1408 can be, or include, a machine-readable media 1422 on which is stored one or more sets of data structures or instructions 1424 (e.g., software) embodying or used by any one or more of the techniques or functions described herein. The instructions 1424 can also reside, completely or at least partially, within any of registers of the hardware processor 1402, the main memory 1404, the static memory 1406, or the mass storage device 1408 during execution thereof by the machine 1400. In an example, one or any combination of the hardware processor 1402, the main memory 1404, the static memory 1406, or the mass storage device 1408 can constitute the machine-readable media 1422. While the machine-readable media 1422 is illustrated as a single medium, the term "machine-readable medium" can include a single medium or multiple media (e.g., a centralized or distributed database, or associated caches and servers) configured to store the one or more instructions 1424.

The term "machine readable medium" can include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1422 can be representative of the instructions 1424, such as instructions 1424 themselves or a format from which the instructions 1424 can be derived. This format from which the instructions 1424 can be derived can include source code, encoded instructions (e.g., in compressed or encrypted form), packaged instructions (e.g., split into multiple packages), or the like. The information representative of the instructions 1424 in the machine-readable media 1422 can be processed by processing circuitry into the instructions to implement any of the operations discussed herein. For example, deriving the instructions 1424 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 can include assembly, compilation, or interpretation of the information (e.g., by the processing circuitry) to create the instructions 1424 from some intermediate or preprocessed format provided by the machine-readable media 1422. The information, when provided in multiple parts, can be combined, unpacked, and modified to create the instructions 1424. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1424 can be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 can include one or more physical jacks (e.g., Ethernet, coaxial, or phone jacks) or one or more antennas to connect to the network 1426. In an example, the network interface device 1420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 can include or use subject matter (such as an apparatus, a system, a device, a method, a means for performing acts, or a device readable medium including instructions that, when performed by the device, can cause the device to perform acts, or an article of manufacture), such as can include or use a method comprising establishing an N-block cache at a first memory-compute node in a compute-near-memory system that includes N different hardware nodes, wherein the first memory-compute node is one of the N different hardware nodes and wherein the N different hardware nodes are coupled by a compute fabric, and for each initial request from the first memory-compute node to read information from a particular one of the N different nodes, populating a corresponding one of the N blocks in the cache with frontier information received from the particular one of the N different nodes. The frontier information can indicate whether a parent of the particular one of the N different nodes was found during a prior search of some or all of the nodes coupled by the compute fabric. In an example, the frontier information comprises a bitmap.

Example 2 can include or use, or can optionally be combined with the subject matter of Example 1, to optionally include, for an initial request from the first memory-compute node to read target information from a first node of the N different nodes, retrieving the target information from the first node via the compute fabric and populating a first one of the N blocks in the cache with the target information retrieved from the first node, and for a subsequent request from the first memory-compute node to read the target information from the first node, reading the target information from the first one of the N blocks in the cache.

Example 3 can include or use, or can optionally be combined with the subject matter of any of examples 1 or 2 to optionally include, for a subsequent request from the first memory-compute node to read information from the particular one of the N different nodes, reading the information from the corresponding one of the cache blocks corresponding to the particular one of the N different nodes.

Example 4 can include or use, or can optionally be combined with the subject matter of any of examples 1-3 to optionally include, at the first memory-compute node, determining whether a subsequent read request can be fulfilled using information from the cache before requesting information from one of the other nodes in the compute-near-memory system.

Example 5 can include or use, or can optionally be combined with the subject matter of any of examples 1-4 to optionally include establishing the cache as a first software object instantiated at the first memory-compute node.

Example 6 can include or use, or can optionally be combined with the subject matter of any of examples 1-5 to optionally include establishing the cache with N blocks of equal size.

Example 7 can include or use, or can optionally be combined with the subject matter of any of examples 1-6 to optionally include establishing a saturating N-block cache.

Example 8 can include or use, or can optionally be combined with the subject matter of any of examples 1-7 to optionally include establishing a cache block for each of the N different nodes in the compute-near-memory system, and each cache block can comprise 1024×64-bit words or elements, or can comprise other-sized words or elements.

Example 9 can include or use, or can optionally be combined with the subject matter of any of examples 1-8 to optionally include populating respective blocks in the cache using results from a bottom-up search algorithm, and the results can include frontier information received from respective different nodes.

Example 10 can include or use, or can optionally be combined with the subject matter of any of examples 1-9 to optionally include populating respective blocks in the cache using results from a breadth first search algorithm, and the results can include frontier information received from respective different nodes.

Example 11 can include or use, or can optionally be combined with the subject matter of Example 10, to optionally include populating the respective blocks in the cache by prioritizing the search algorithm based on a connectedness of the nodes to be searched, and nodes with more neighbors or connections to other nodes can be prioritized over nodes with fewer neighbors or connections to other nodes.

Example 12 can include or use, or can optionally be combined with the subject matter of any of examples 1-11 to optionally include establishing the N-block cache as a static cache without an eviction policy.

Example 13 can include or use, or can optionally be combined with the subject matter of any of the preceding examples to optionally include an apparatus comprising a first memory-compute node of multiple memory-compute nodes in a compute-near-memory system, wherein the first memory-compute node comprises a processor configured to perform operations comprising establishing an N-block software cache, wherein each of the N blocks corresponds to a respective one of the memory-compute nodes in the compute-near-memory system, and populating the respective blocks in the cache using frontier information received from the respective memory-compute nodes in the compute-near-memory system. The frontier information can indicate whether a parent of the particular one of the nodes was found during a search of some or all of the nodes coupled by a compute fabric. In an example, the frontier information comprises a bitmap.

Example 14 can include or use, or can optionally be combined with the subject matter of Example 13, to optionally include or use the processor to further perform operations comprising using a breadth first search algorithm to populate the blocks in the cache.

Example 15 can include or use, or can optionally be combined with the subject matter of Example 14, to optionally include using a bottom-up search approach to populate the blocks in the cache.

Example 16 can include or use, or can optionally be combined with the subject matter of any of examples 13-15 to optionally include populating the blocks in the cache using a search algorithm that is prioritized according to a connectedness of the nodes in the system.

Example 17 can include or use, or can optionally be combined with the subject matter of any of examples 13-16 to optionally include a second memory-compute node of the multiple memory-compute nodes in the compute-near-memory system, and the second memory-compute node comprises a second processor configured to perform operations comprising establishing an N-block software cache for use by the second memory-compute node, wherein each of the N blocks corresponds to a respective one of the memory-compute nodes in the compute-near-memory system, populating one of the N blocks in the software cache using frontier information received from the first memory-compute node in the compute-near-memory system, and populating the other respective N−1 blocks in the software cache using frontier information received from the other respective memory-compute nodes in the compute-near-memory system.

Example 18 can include or use, or can optionally be combined with the subject matter of any of the preceding examples to optionally include a memory-compute system comprising N different memory-compute nodes coupled by a scale fabric to provide a compute fabric. In Example 18, each of the N nodes comprises a hybrid threading processor and a hybrid threading fabric, and a first memory-compute node of the N different memory-compute nodes comprises a processor configured to perform operations comprising establishing an N-block software cache, wherein each of the N blocks corresponds to a respective one of the memory-compute nodes coupled by the scale fabric, and populating the respective blocks in the cache using frontier information received from the respective nodes. The frontier information can indicate whether a parent of a corresponding one of the N nodes was found during a prior search of some or all of the nodes coupled by the hybrid threading fabric.

Example 19 can include or use, or can optionally be combined with the subject matter of Example 18 to optionally include the processor of the first memory-compute node configured to populate the blocks in the cache during a breadth first search algorithm.

Example 20 can include or use, or can optionally be combined with the subject matter of Example 18 or 19 to optionally include, at each of the N different memory-compute nodes, a respective processor and memory circuit configured to implement respective N-block software-based caches, and each software-based cache on a particular node can be configured to store information received from each of the other nodes.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
   establishing an N-block cache at a first memory-compute node in a compute-near-memory system that includes N different hardware nodes, wherein the first memory-compute node is one of the N different hardware nodes and wherein the N different hardware nodes are coupled by a compute fabric;
   for each initial request from the first memory-compute node to read information from a particular one of the N different nodes, populating a corresponding one of the N blocks in the cache with frontier information received from the particular one of the N different nodes, wherein the frontier information indicates whether a parent of the particular one of the N different nodes was found during a prior search of some or all of the nodes coupled by the compute fabric; and
   for an initial request from the first memory-compute node to read target information from a first node of the N different nodes, retrieving the target information from the first node via the compute fabric and populating a first one of the N blocks in the cache with the target information retrieved from the first node, and for a subsequent request from the first memory-compute node to read the target information from the first node, reading the target information from the first one of the N blocks in the cache.

2. The method of claim 1, further comprising, at the first memory-compute node, determining whether a further subsequent request can be fulfilled using information from the cache before requesting information from one of the other nodes in the compute-near-memory system.

3. The method of claim 1, wherein establishing the N-block cache includes establishing the cache as a first software object instantiated at the first memory-compute node.

4. The method of claim 1, wherein establishing the N-block cache includes establishing the cache with N blocks of equal size.

5. The method of claim 1, wherein establishing the N-block cache includes establishing a saturating N-block cache.

6. The method of claim 1, wherein establishing the N-block cache includes establishing a cache block for each of the N different nodes in the compute-near-memory system, and wherein each cache block comprises 1024×64-bit words.

7. The method of claim 1, further comprising populating respective blocks in the cache using results from a bottom-up search algorithm, wherein the results include frontier information received from respective different nodes.

8. The method of claim 1, further comprising populating respective blocks in the cache using results from a breadth first search algorithm, wherein the results include frontier information received from respective different nodes.

9. The method of claim 8, wherein populating the respective blocks in the cache includes prioritizing the search algorithm based on a connectedness of the nodes to be searched, wherein nodes with more neighbors or connections to other nodes are prioritized over nodes with fewer neighbors or connections to other nodes.

10. The method of claim 1, wherein establishing the N-block cache includes establishing a static cache without an eviction policy.

11. An apparatus comprising:
    a first memory-compute node of multiple memory-compute nodes in a compute-near-memory system, wherein the first memory-compute node comprises a processor configured to perform operations comprising:
    establishing an N-block software cache, wherein each of the N blocks corresponds to a respective one of the memory-compute nodes in the compute-near-memory system; and
    populating the respective blocks in the cache using frontier information received from the respective memory-compute nodes in the compute-near-memory system, wherein populating the respective blocks comprises prioritizing a search algorithm according to a connectedness of the nodes in the system.

12. The apparatus of claim 11, wherein the processor is configured to further perform operations comprising using a breadth first search algorithm to populate the blocks in the cache.

13. The apparatus of claim 12, wherein using the breadth first search algorithm includes using a bottom-up approach to populate the blocks in the cache.

14. The apparatus of claim 11, further comprising a second memory-compute node of the multiple memory-compute nodes in the compute-near-memory system, wherein the second memory-compute node comprises a second processor configured to perform operations comprising:
  establishing an N-block software cache for use by the second memory-compute node, wherein each of the N blocks corresponds to a respective one of the memory-compute nodes in the compute-near-memory system;
  populating one of the N blocks in the software cache using frontier information received from the first memory-compute node in the compute-near-memory system; and
  populating the other respective N−1 blocks in the software cache using frontier information received from the other respective memory-compute nodes in the compute-near-memory system.

15. A memory-compute system comprising:
  N different memory-compute nodes coupled by a scale fabric to provide a compute fabric, wherein each of the N nodes comprises a hybrid threading processor and a hybrid threading fabric, wherein a first memory-compute node of the N different memory-compute nodes comprises a processor configured to perform operations comprising:
    establishing an N-block software cache, wherein each of the N blocks corresponds to a respective one of the memory-compute nodes coupled by the scale fabric;
    populating the respective blocks in the cache using frontier information received from the respective nodes, wherein the frontier information indicates whether a parent of a corresponding one of the N nodes was found during a prior search of some or all of the nodes coupled by the hybrid threading fabric; and
    for an initial request from the first memory-compute node to read target information from a second node of the N different memory-compute nodes, retrieving the target information from the second node via the compute fabric and populating a first one of the N blocks in the cache with the target information retrieved from the second node, and for a subsequent request from the first memory-compute node to read the target information from the second node, reading the target information from the first one of the N blocks in the cache.

16. The memory-compute system of claim 15, wherein the processor of the first memory-compute node is configured to populate the blocks in the cache during execution of a breadth first search algorithm.

17. The memory-compute system of claim 15, wherein each of the N different memory-compute nodes includes a respective processor and memory circuit configured to implement respective N-block software-based caches, wherein each software-based cache on a particular node is configured to store information received from each of the other nodes.

18. The memory-compute system of claim 15, wherein establishing the N-block cache includes establishing the cache with N blocks of equal size.

19. The memory-compute system of claim 15, wherein populating the respective blocks in the cache includes using results from a breadth first search algorithm, wherein the results include frontier information received from respective different nodes.

20. The memory-compute system of claim 19, wherein populating the respective blocks in the cache includes prioritizing the search algorithm based on a connectedness of the nodes, wherein nodes with more neighbors or connections to other nodes are prioritized over nodes with fewer neighbors or connections to other nodes.

* * * * *